Aug. 14, 1945.   E. B. HAVAS   2,382,222
FOOD SEPARATING UTENSIL
Filed March 24, 1944   2 Sheets-Sheet 1
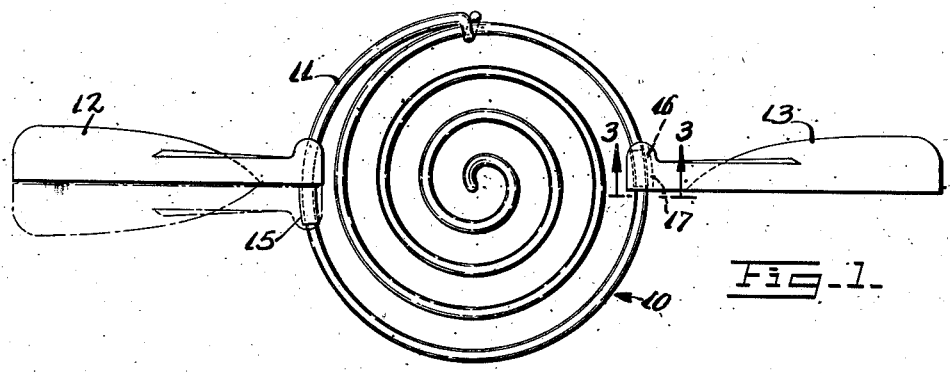
Fig. 1.
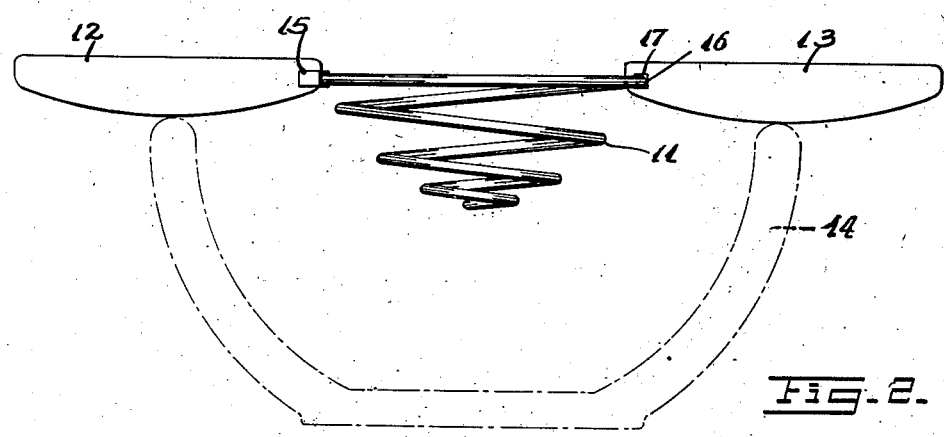
Fig. 2.
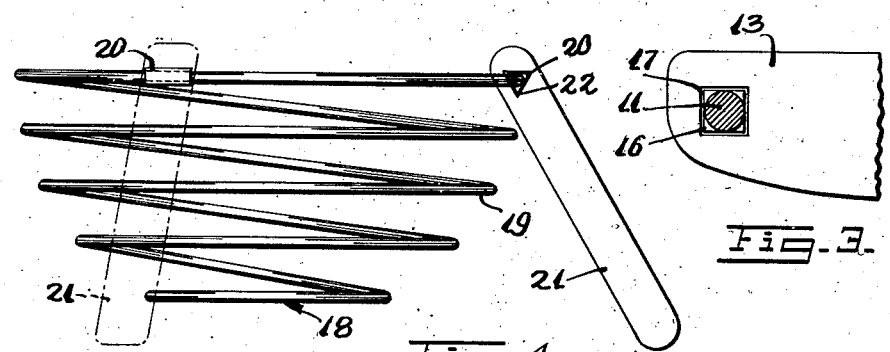
Fig. 3.
Fig. 4.
Fig. 5.
INVENTOR.
Elizabeth B. Havas
BY
*[signature]*
ATTORNEY Aug. 14, 1945.   E. B. HAVAS   2,382,222
FOOD SEPARATING UTENSIL
Filed March 24, 1944   2 Sheets-Sheet 2

INVENTOR.
Elizabeth B. Havas
BY
ATTORNEY

Patented Aug. 14, 1945

2,382,222

UNITED STATES PATENT OFFICE 2,382,222

FOOD SEPARATING UTENSIL

Elizabeth B. Havas, Jackson Heights, N. Y.

Application March 24, 1944, Serial No. 527,893

4 Claims. (Cl. 146—2)

This invention relates to new and useful improvements in strainers and more particularly to an egg separator for separating the white of an egg from its yoke.

The invention proposes a construction of a strainer, such as an egg separator, which is characterized by having two handles, one of which is movable relative to the other whereby the handles may be disposed adjacent each other so that both handles of the strainer may be held in a person's hand, or the handles may be oppositely disposed to bridge a dish into which the strained substance is to fall.

Still further the invention proposes a strainer having handles as aforesaid which may also serve as legs.

Still further the invention proposes a strainer as aforesaid having at least one handle rigidly secured to the straining element and one handle movably secured thereto.

A further object of this invention is to provide an egg separator adapted to simultaneously separate the whites of several eggs from their yokes without danger of the yokes breaking.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a plan view of a strainer embodying the present invention, a movable handle being shown in dot-dash lines in its position adjacent rigid handle.

Fig. 2 is a side elevation of the strainer of Fig. 1, a dish being indicated in dot-dash lines.

Fig. 3 is an enlarged section on the line 3—3 of Fig. 1 showing a portion of the strainer thereof.

Fig. 4 is a side elevation of a strainer constructed in accordance with another modification of invention, parts being indicated in dot-dash lines.

Fig. 5 is an enlarged view, similar to Fig. 3, of a portion of the strainer of Fig. 4, a part being shown in section.

Figure 6:
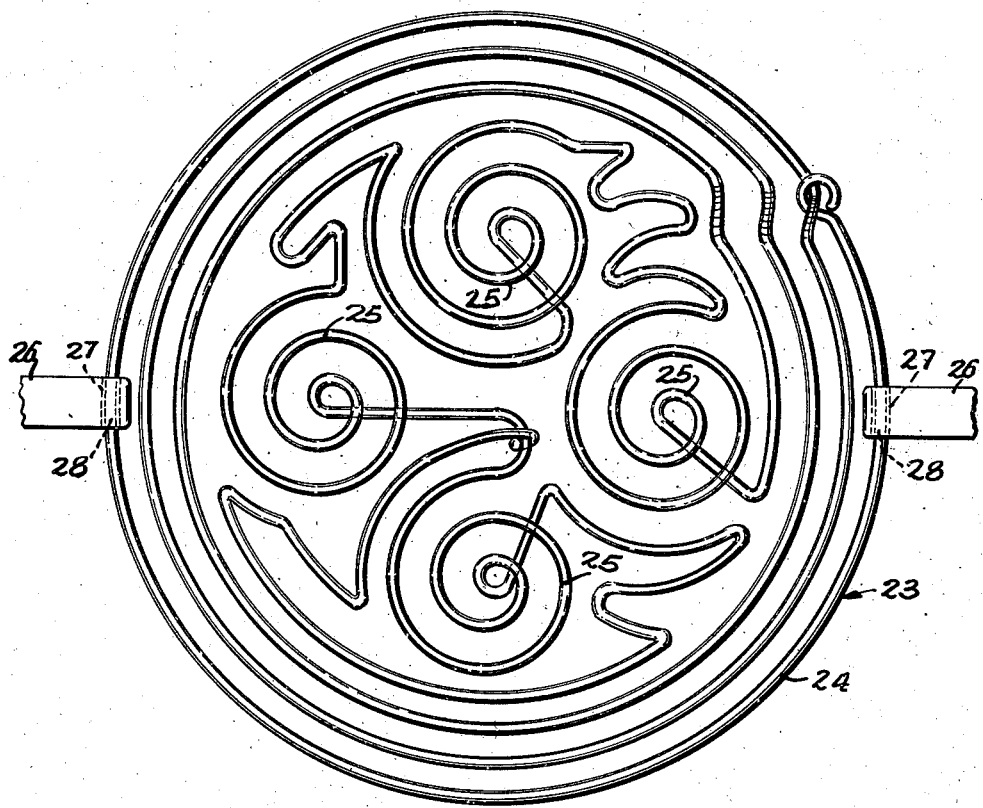
Fig. 6 is a plan view of a strainer constructed in accordance with a further modification of this invention, parts being broken away.

The strainer 10 shown in Fig. 1, according to this invention, has a straining basket 11 formed of cylindrical wire wound helically to provide approximately half a sphere. While the basket may be used for straining various substances, it is particularly adapted for straining, that is to say separating, the white of an egg from its yoke.

A handle 12 is rigidly secured to the top coil of the basket. One side of handle 12 is straight whereas the other side is rounded. The basket is also provided with a movable handle 13 which is similarly but reversely shaped to the handle 12 so that when handles 12 and 13 are adjacent each other, their flat straight sides mate and are in engagement. Such a position of the handles is shown in Fig. 1 at the left hand side, the movable handle being indicated in dot-dash lines. It will be obvious that when the handles are so disposed, they form in effect a single handle which may easily be grasped in a person's hand.

The movable handle 13 may be, when desired, moved to a position diametrically opposite the handle 12, as shown in full lines in Fig. 1. The purpose of this is so that the handles will form a bridge spanning the sides of a dish for support of the strainer by the dish, as shown in Fig. 2 wherein a dish 14 is indicated in dot-dash lines.

The handles may be made of any suitable material such as metal or plastic. As the wire of the basket is round, means must be provided to hold the movable handle 13 rigid horizontally when the handle 13 is in either of its operative positions as aforedescribed. Accordingly, the top coil of the basket has a portion 15 adjacent handle 12, square in cross section and curved longitudinally similar to the top coil of the basket, and a similar portion 16 on the top coil diametrically opposite the handle 12. Portions 15 and 16 may be made square in cross section in any suitable well known manner, such as by upsetting the metal of the top coil or by building up with weld metal. Portions 15 and 16 each have a width and height substantially similar to the diameter of the wire of the basket.

Handle 13 has a passage 17 of substantially the same shape as portions 15 and 16 but slightly larger so that portions 15 and 16 will slide easily in passage 17.

The operation of the strainer 10 is as follows:

Assuming strainer 10 is a one egg size egg separator, the person desiring to separate the egg will employ the strainer with the two handles 12 and 13 in engagement with each other. At such time portion 15 will be disposed in passage 17 and will maintain handle 13 in its proper position relative to handle 12.

After the egg white is separated, it may be desirable to leave the yoke in the basket until it is needed. For instance, the strainer may be employed as a mixer, in which case the yoke would not be removed from the basket at all. Thus the person using the separator may wish to lay the separator aside with the yoke in the basket until such time as the yoke is needed. If such is the case, the person may merely move handle 13 around to a position on the opposite side of basket 11 from handle 12 so that portion 16 is then disposed in passage 17. The strainer may then be placed over the dish 14 with the handles resting on the edge thereof and left there until needed. Portion 16 will maintain the handle 13 in rigid horizontal position during this operation.

If basket 11 is large so that a plurality of eggs may be placed therein at one time for the simultaneous separation of the whites from the yokes, the movable handle 13 has added the advantage that it may be used to bridge the dish so that the eggs can separate slowly until all of the white has been removed. This enables the person using the strainer to perform other duties rather than to have to retain a hold on the strainer until separation is complete.

If desired, the entire basket may be coiled from wire square in cross section, or the top coil of the basket may be square in cross section. It will be apparent that other shapes than a shape square in cross section may be employed if desired and the use of such other shapes are within the contemplation of the present invention.

In the modified form of the invention shown in Figs. 4 and 5, the strainer 18 has a basket 19 similar to basket 11 except that it is larger and has a flat bottom so that a plurality of eggs may be separated at one time with the yokes laying side by side. This has the added advantage that the yokes will not be broken by the weight of one yoke on top of another. Strainer 18 has triangular portions 20 on the top coil of the basket. It is contemplated that the basket will be provided with three legs 21 so that it may be set over a dish while the eggs are separating. For simplicity only one leg is shown in full in Fig. 4 and one indicated in dot-dash lines. However, as it is contemplated that three legs will be employed, the portions 20 will be 120 degrees apart.

Each of the legs 21 may be movable so that the three may be moved together to form a handle. At least one portion 20 is therefore made long enough to receive the three legs simultaneously. Each leg is provided with a triangular passage 22 slightly larger than the portions 20. If desired, one of the legs may be rigidly secured to the basket similar to the manner in which handle 12 is secured to basket 11. However, it is preferred to have all the legs movable. They can then each be moved so that a cylindrical portion of the top coil is in each of the passages 22 and the legs can then be folded up into the interior of the basket. This enables the strainer 18 to be packed and shipped, as well as to be stored away, very conveniently.

Figure 7:
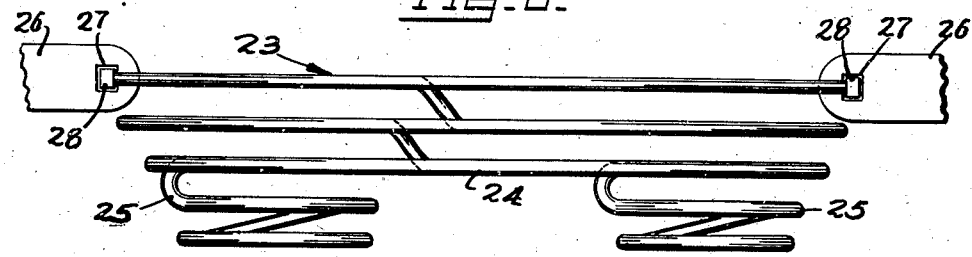
Fig. 7 is a side elevation of the structure shown in Fig. 6.

In the modified form of the invention shown in Figs. 6 and 7, the strainer 23 has a basket 24 provided with four cells 25 in each of which an egg may be disposed so that four eggs may be separated at one time without the yokes of the eggs touching. This feature of the strainer 23 further insures the whites of the eggs being separated from the yokes without the yokes breaking. Basket 24 is provided with two movable handles 26, each provided with a passage 27 square in cross section for coacting with a portion 28 square in cross section. Handles 26 may be folded over into the basket 24 when not in use, if desired, similar to the legs 21. However, basket 24 may be provided with handles similar to handles 12 and 13 if desired, or it may be provided with legs similar to legs 21.

Figure 8:
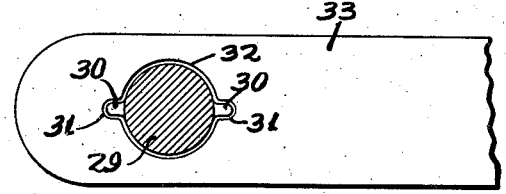
Fig. 8 is a view, similar to Fig. 3, of a portion of a strainer constructed in accordance with another modification of this invention.

In the modified form of the invention shown in Fig. 8, the top coil 29 of a basket is provided with wings 30 for coacting with recesses 31 in a cylindrical passage 32 of a handle 33. The wings 30 operate similarly to the portions 15 and 16 of strainer 10, but have the advantage that they may easily be formed by being pressed out of the metal of the top coil itself.

While the several types of strainers shown in the drawings have been described more or less in relation to their function as egg separators, it will be understood that the principle of the present invention has adaptation to various types of strainers which may be employed for other purposes than for separating eggs.

All of the strainers shown in the drawings are characterized by having at least two handles, one of which is movable so that it can be moved into position adjacent the other handle to coact therewith to provide a strong handle, and that can be moved to another position to adapt the strainer to bridge a dish or the like so that it is unnecessary for the person using the strainer to be holding it while the straining is taking place.

This kitchen utensil may also be used for separating any other food, for lifting potatoes, string beans and other vegetables from boiling kettles, etc.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A strainer comprising a straining basket having a top horizontal wire coil circular in cross section throughout the major portion of its length and having a short portion at a zone thereon having a plurality of sides, and a handle having a passage through which said coil freely extends, said handle being thereby adapted for movement along said coil, said passage being of similar shape in cross section to the cross sectional shape of said portion whereby when said handle is moved to dispose said portion in said passage, said portion holds said handle against vertical rotation about the axis of said passage, and when said handle is disposed with a portion of said coil circular in cross section in said passage, said handle is free to be rotated about said axis of said passage whereby said handle may be rotated into said basket.

2. A strainer having a strainer basket bent of a continuous piece of wire and upon the top coil of which a pair of mating handles consisting of a fixed handle and a movable handle are mounted so that when the handles are brought together they form a single handle, means for holding said movable handle against rotation in a vertical plane when positioned adjacent said fixedly mounted handle or when positioned diametrically opposite said fixedly mounted handle, comprising portions formed in said top coil adjacent said fixedly mounted handle which are non-circular in vertical cross section, said movable handle being formed with a passage of non-circular shape in cross section and corresponding with the non-circular cross sectional shape of said portions, so that when said movable handle is engaged with either of said portions it will be held against rotation in a vertical plane.

3. A strainer having a strainer basket bent of a continuous piece of wire and upon the top coil of which a pair of mating handles consisting of a fixed handle and a movable handle are mounted so that when the handles are brought together they form a single handle, means for holding said movable handle against rotation in a vertical plane when positioned adjacent said fixedly mounted handle or when positioned diametrically opposite said fixedly mounted handle, comprising portions formed in said top coil adjacent said fixedly mounted handle and diametrically opposite said fixedly mounted handle which are non-circular in vertical cross section, said movable handle being formed with a passage of non-circular shape in cross section and corresponding with the non-circular cross sectional shape of said portions, so that when said movable handle is engaged with either of said portions it will be held against rotation in a vertical plane, said portions and passage being square in cross section.

4. A strainer having a strainer basket bent of a continuous piece of wire and upon the top coil of which a pair of mating handles consisting of a fixed handle and a movable handle are mounted so that when the handles are brought together they form a single handle, means for holding said movable handle against rotation in a vertical plane when positioned diametrically opposite said fixedly mounted handle, comprising portions formed in said top coil adjacent said fixedly mounted handle and diametrically opposite said fixedly mounted handle which are non-circular in vertical cross section, said movable handle being formed with a passage of non-circular shape in cross section and corresponding with the non-circular cross sectional shape of said portions, so that when said movable handle is engaged with either of said portions it will be held against rotation in a vertical plane, said portions and passage being triangular in cross section.

ELIZABETH B. HAVAS.